June 14, 1960     G. NOSSARDI ET AL     2,940,831
METHOD OF AND INSTALLATION FOR THE CONTINUOUS
EXTRACTION OF MAGNESIUM WITH MILK OF LIME
FROM SEA WATERS AND THE LIKE
Filed Nov. 29, 1955
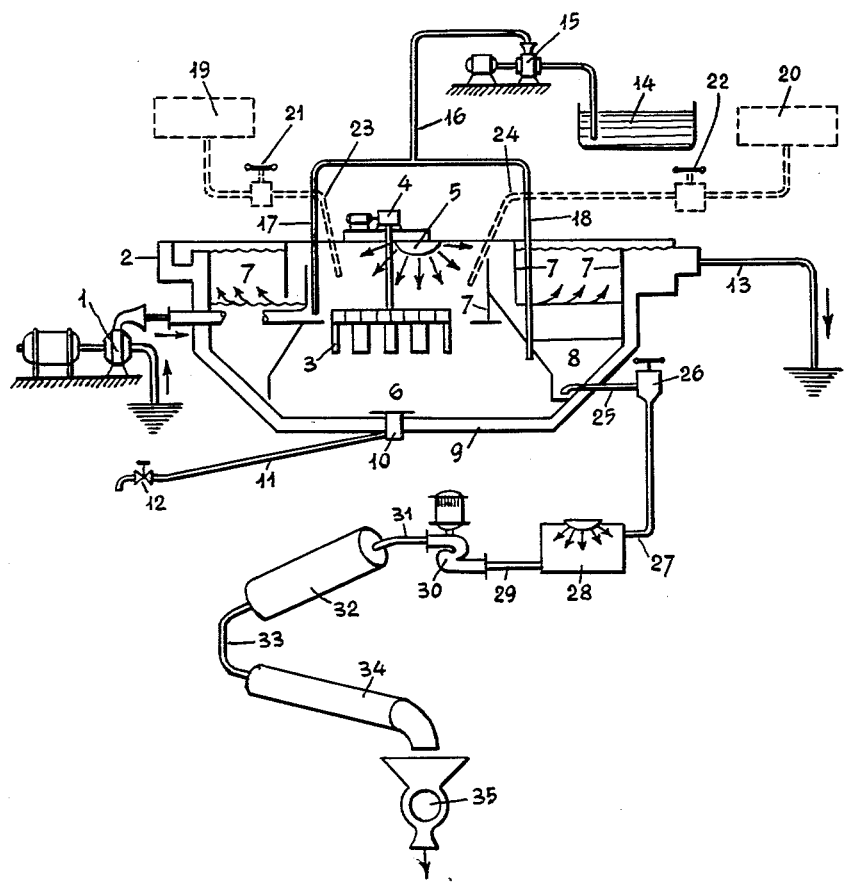
INVENTOR.
BY

United States Patent Office 2,940,831
Patented June 14, 1960

2,940,831

METHOD OF AND INSTALLATION FOR THE CONTINUOUS EXTRACTION OF MAGNESIUM WITH MILK OF LIME FROM SEA WATERS AND THE LIKE

Gerolamo Nossardi, Via A. Provana 1, Genoa-Nervi, Italy, and Mario Marengo, Via Capo S. Rocco 6, Genoa-Quarto, Italy Filed Nov. 29, 1955, Ser. No. 549,833

Claims priority, application Italy Dec. 23, 1954

5 Claims. (Cl. 23—201)

It is known that magnesium hydrate $Mg(OH)_2$ is precipitated by treating a solution of convertible magnesium salts with a solution of an alkaline hydrate.

This principle can be applied to the production of the different magnesium compositions required industrially, by recovering magnesium values from mineral waters which contain magnesium in the form of magnesium chloride $MgCl_2$ or magnesium sulphate $MgSO_4$ or both in admixture.

The largest source of mineral waters containing said salts is sea-water and saline mother liquors which, owing to the fact that they are more concentrated, contain a larger quantity of magnesium salts than an equal volume of ordinary sea-water. The present process and installation are capable of application, with appropriate allowances, both for saline mother liquors and any other magnesium liquor, but in view of the foregoing reference is made by way of example to ordinary sea-water.

The most suitable alkaline earth hydrates adapted to be used as precipitants from the economic viewpoint are, as is known, those of calcium and those of barium. While the first has the disadvantage of very poor solubility in water, it does have the advantage of ensuring good precipitation of magnesium salts without any fear of the simultaneous deposition of calcium sulphate which occurs when use is made of barium hydrate, when the simultaneous precipitation of barium sulphate is observed.

The present process and installation for the extraction of magnesium use lime as precipitant, taking the following known reaction as a basis:

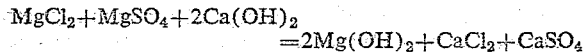

$$MgCl_2 + MgSO_4 + 2Ca(OH)_2 = 2Mg(OH)_2 + CaCl_2 + CaSO_4$$

The present process and installation for the extraction of magnesium are charactized by the fact that water containing convertible magnesium salts and milk of lime are continuously introduced into a decanting reactor, while the exhausted water, that is to say the water more or less completely freed of the magnesium salts, is extracted from the top of said decanting reactor, and the precipitate of magnesium salts and/or the sludges of salts precipitated in the decanting reactor are extracted from the bottom at intervals determined by practice.

The present process is further characterized by the fact that the reaction in the decanting reactor takes place under the action of an agitator and with successive passage of the substances into the reaction and mixing zones; the mixing action, the reaction, and the decantation are effected by the action of supersonic vibrations produced with a direction coinciding with the direction of precipitation of the salts.

The process is further characterized by the fact that the quantities of water containing convertible magnesium salts and of milk of lime which are introduced into the decanting reactor are reciprocally in the stoichometric relationship [1] required for the reaction, this being achieved by virtue of the fact that the water containing the salts and the milk of lime is introduced into the decanting reactor through devices having a variable output to permit regulation.

The process according to the invention is further characterized by the fact that the sludges extracted from the decanting reactor are successively subjected to supersonic treatment acting in the direction of decantation of said sludges, and after being centrifuged and washed they are successively passed to a calcining furnace where the magnesium hydroxide $Mg(OH)_2$ is converted into magnesium oxide $MgO$ which is then cooled, passing through an apparatus for final treatment.

When the magnesium oxide produced by the process is intended to be used in admixture with other compounds, for example with a ceramic binding agent, which is required for example in the treatment of special refractory materials, the process of the invention is characterized by the fact that there are introduced into the decanting reactor, simultaneously with the reactions giving rise to the formation and precipitation of magnesium salts, components adapted to cause the deposition of salts of these other components. These last-named salts, such as iron salts, aluminum salts, etc., are effective in the successive calcining operations, to give the desired quantities of said other components required for the direct utilization of the final product obtained, for special uses, thus enabling the small particles of magnesium oxide and those of said other components, for example $Fe_2O_3$, $Al_2O_3$ etc., to be obtained in the most intimately mixed state possible and giving a product which is in the nature of a compound rather than of a mere mixture.

The installation for carrying out the above indicated process is characterized by the presence of a decanting reactor containing means for the continuous supply of the water containing convertible magnesium salts, means for the continuous supply of milk of lime, means for the continuous extraction of the exhausted waters, that is to say waters containing practically no magnesium salts, and means for the extraction from the bottom, at intervals determined by experience, of the precipitated magnesium salts and salt sludges precipitated in the interior of the decanting reactor.

The installation described above is further characterized by the fact that the decanting reactor is provided with an agitator and with walls which form ducts suitable for producing successive passage of substances into the reaction and mixing zones, and also with a device emitting supersonic waves having a direction of propagation coinciding with that of the precipitation of the salts.

The installation is further characterized by the presence, in the milk of lime supply piping and/or in the supply piping for the water containing the magnesium salts, of a variable flow device for the regulation of these supplies.

The installation is also characterized by the presence of another device producing supersonic waves acting in the direction of the decanting of the precipitated products and muds, this device being disposed on the pipeline for the discharge of water from the decanting reactor, and also by the presence of a centrifuging and washing device, a calcining furnace, a cooling means, and devices for the final treatment.

The installation is finally characterized by the presence of means for the graduated and variable supply inside the decanting apparatus of compositions capable of interact-

---

[1] Stoichiometric mathematical calculations enable the quantity to be calculated, in a weight expressed in grams, both of the substances cooperating for a reaction and of the compounds obtained from said reaction.

ing and causing the further and simultaneous precipitation of other components and salts desired, which are produced intimately mixed with the products of the reaction and decanting of the waters containing convertible magnesium salts.

In the accompanying drawing the installation and its essential components are shown diagrammatically. Referring to said drawing, 1 is a pump for collecting sea water, 2 is a decanting reactor inside which are disposed the agitator 3 driven by the motor 4, and the apparatus 5 for emitting supersonic vibration. Referring further to the drawing, 6 is a mixing chamber, 7 are diaphragms, 8 is the collecting chamber for the magnesium and sludge precipitates, 9 is an intermediate protection space, 10 is a tapping for the withdrawal of the contents of the decanting reactor, tapping 10 operating through the pipe 11 and the shut-off means 12, and 13 is the discharge piping for the exhausted water. The tank 14 contains the milk of lime, which is drawn by a pump 15 and passed, through pipes 16, 17, and 18, into the decanting reactor 2. The tanks 19 and 20 are optional and are intended to contain other compositions for possible introduction into the decanting reactor 2, which compositions can be charged by means of the devices 21 and 22 for regulating the quantities which are passed through pipes 23 and 24 into the chamber 6 of the decanting reactor. These other compositions are intended to produce precipitates which are capable of then producing other compositions, such as binding agents, for the final product. The pipe 25, which penetrates into the chamber 8 of the decanting reactor 2, serves to collect the magnesium precipitates which flow, through an automatic or manual shut-off means 26 of the pipe 27, into a tank 28 provided with an apparatus emitting supersonic waves. From said tank the said precipitates pass through the pipe 29 into the washing, centrifuging and filtering apparatus 30, whence they pass through the pipe 31 into a calcining furnace 32. On emerging from the latter the precipitates follow the pipe 33 and pass into the cooling device 34 and then pass, directly or after purification processes, into the grinding apparatus 35.

The operation of the installation shown in the drawing is as follows: The sea water, purified if necessary with known means by carbonated, bicarbonates, etc., is drawn by the pump 1, which passes the water to the decanting reactor, into the mixing chamber 6, in which is disposed the agitator 3 driven by the motor 4. There is simultaneously introduced into chamber 6 milk of lime, that is to say calcium oxide, which on emerging from calcining furnaces is passed into a suitable installation of known type (not illustrated in the drawing) in which it is converted into calcium hydroxide $Ca(OH)_2$. In this installation it is treated with a suitable quantity of water in such manner that each liter of the mixture contains 30 to 70 grams of calcium hydrate. This suspension then passes into the tank 14 in the state of milk of lime in the above mentioned variable concentration and in such manner that the small particles of lime in suspension have a predetermined size, that is to say (on account of the formation of lusters) such as to be capable of being filtered through a screen of variable fineness up to 3000 meshes per square centimeter and ensuring a rapid reaction with the magnesium salts contained in the sea water.

The milk of lime diluted as described above is introduced by means of the pump 15 which, by suitable regulating means connecting said pump to the pump 1 for supplying the sea water (apparatus of known type not illustrated in the drawing), enables sea water and milk of lime to be supplied continuously and in such stoichiometric proportions as to obtain complete precipitation, in the hydroxide state, of the magnesium, without an excess of either of the reacting substances being present.

In the chamber 6 the above mentioned mixture is agitated and subjected to the action of supersonic waves emitted by the apparatus 5, these waves increasing the rapidity of precipitation owing to the fact that the waves are propagated in the same direction as that in which the precipitates fall.

While being precipitated in the chemical sense, the magnesium salts and sludges remain in suspension by the action of the agitator 3 and gradually, passing over the diaphragms 7, are deposited in the chamber 8.

The above-described process undergoes a modification when the product is intended for special treatments, in which case, in addition to the milk of lime, introduced as described above, there are introduced into the decanting reactor 2 other compositions intended to give as a final product a modified composition, such as a ceramic binding agent for example for the treatment of refractory materials. These other compositions, coming from the tanks 19 and 20, are suitably regulated in respect of quantity by devices 21 and 22.

The precipitates: magnesium oxide, salt sludges, and/or compositions (in the case of special treatment) of the chamber 8 of the decanting reactor pass into the tank 28 where they are subjected to supersonic rays which facilitate the collecting of magnesium hydroxide or other magnesium compositions.

The precipitates pass through the pipe 29 into the apparatus 30 which subjects said precipitates to washing, centrifuging and filtering, and they then pass through the pipe 31 into a rotary calcining furnace in which the magnesium hydroxide is converted into magnesium oxide having different properties depending upon the temperature at which calcining is effected; and in the case of special treatments the different compounds, depending on the compositions originally brought into reaction, are dehydrated.

The magnesium oxide and/or the other compositions pass successively through the pipe 33 into a cooling device 34 and, if necessary, into a mill 35 for pulverising, or pass to other purification processes (of known type and not illustrated in the drawing) depending on the purpose for which they are to be used.

Although the present invention has been based for descriptive reasons on what has been described above and illustrated by way of example in the accompanying drawing, several modifications and additions may be made in putting the invention into effect, all these being based on fundamental conceptions of the same invention however, as defined in the claims.

What we claim is:

1. A process for the continuous recovery of the magnesium values from sea-water and like brines with milk of lime which comprises the steps of continuously introducing water containing dissolved magnesium salts into a reaction zone along with milk of lime to effect the precipitation of insoluble magnesium hydroxide in said zone, continuously agitating the contents of said zone and bringing said contents into contact with supersonic vibrations acting in the direction of precipitation of said insoluble hydroxide, continuously transferring said water containing the precipitated insoluble magnesium hydroxide into an immediately adjacent decanting zone by overflow from said reaction zone to said decanting zone, continuously withdrawing water substantially free from said magnesium hydroxide by overflow from the top of said decanting zone, and withdrawing the precipitated hydroxide at intervals from the bottom of said decanting zone.

2. A process for the continuous recovery of the magnesium values from sea-water and like brines with milk of lime which comprises the steps of continuously introducing water containing dissolved magnesium salts into a reaction zone along with milk of lime to effect the precipitation of insoluble magnesium hydroxide in said zone, continuously agitating the contents of said zone, continuously transferring said water containing the precipitated insoluble magnesium hydroxide into an immediately adjacent decanting zone by overflow from said reaction zone to said decanting zone, continuously withdrawing water substantially free from said magnesium hydroxide by overflow from the top of said decanting zone, and withdrawing the precipitated magnesium hydroxide with associated water at intervals from the bottom of said decanting zone, passing said precipitated magnesium hydroxide and water to a confined treatment zone, bringing the contents of said treatment zone into contact with supersonic vibrations acting in the direction of gravity, centrifuging and washing the magnesium hydroxide, passing the washed hydroxide to a calcining zone in which the magnesium hydroxide is converted into magnesium oxide and cooling said magnesium oxide.

3. A process for the continuous recovery of the magnesium values from sea-water and like brines with milk of lime which comprises the steps of continuously introducing water containing dissolved magnesium salts into a reaction zone along with milk of lime to effect the precipitation of insoluble magnesium hydroxide in said zone, continuously introducing into said zone salts selected from the group consisting of iron salts, aluminum salts, and like salts of metals other than magnesium reactive with said milk of lime to form insoluble compounds, continuously agitating the contents of said zone and bringing said contents into contact with supersonic vibrations acting in the direction of precipitation of said insoluble hydroxide and said insoluble compounds, continuously transferring said water containing the precipitated insoluble magnesium hydroxide and said compounds into an immediately adjacent decanting zone by overflow from said reaction zone to said decanting zone, continuously withdrawing water substantially free from said magnesium hydroxide and said compounds by overflow from the top of said decanting zone, and withdrawing the precipitated hydroxide and compounds at intervals from the bottom of said decanting zone, passing said precipitated hydroxide and said compounds and water to a confined treatment zone, bringing the contents of said treatment zone into contact with supersonic vibrations acting in the direction of gravity, centrifuging and washing the hydroxide and compounds and passing the washed hydroxide and compounds to a calcining zone to convert the hydroxides and compounds into the corresponding oxides, and cooling the mixed oxides.

4. Apparatus for the continuous recovery of magnesium values from sea-water and like brines with milk of lime which comprises a tank, partition means defining a reaction chamber in the center of said tank, means for continuously supplying water containing dissolved magnesium salts to said chamber, means for continuously supplying milk of lime to said chamber, said partition means in said tank defining a decanting chamber immediately adjacent decanting chamber for continuously receiving the contents of said reaction chamber by overflow from said reaction chamber, means for continuously removing water substantially free from precipitated compounds overflowing from the top of said decanting chamber, removing means for removing precipitated compounds from the bottom of said decanting chamber, means defining a vibration chamber containing means for emitting supersonic waves in said last-named chamber, said removing means including conduit means for conducting said compounds from said decanting chamber to said vibration chamber, water separation means, compound washing means, and a calcining furnace for receiving washed compounds.

5. Apparatus for the continuous recovery of magnesium values from sea-water and like brines with milk of lime which comprises a tank, partition means defining a reaction chamber in said tank, means for continuously supplying water containing dissolved magnesium salts to said chamber, means for continuously supplying milk of lime to said chamber, means for supplying solutions of salts of metals other than magnesium reactive with said milk of lime to said reaction chamber, said partition means in said tank defining a decanting chamber immediately adjacent said reaction chamber for continuously receiving the contents of said reaction chamber by overflow from said reaction chamber, means for continuously removing water substantially free from precipitated compounds overflowing from the top of said decanting chamber, and means for removing precipitated compounds from the bottom of said decanting chamber, means defining a vibration chamber containing means for emitting supersonic waves in said last-named chamber, said removing means including conduit means for conducting said compounds from said decanting chamber to said vibration chamber, water separation means, compound washing means, and a calcining furnace for receiving washed compounds.

References Cited in the file of this patent

UNITED STATES PATENTS

| | | |
|---|---|---|
| 2,143,610 | Muller et al. | Jan. 10, 1939 |
| 2,405,055 | Robinson et al. | July 30, 1946 |
| 2,484,013 | Calhoun | Oct. 11, 1949 |
| 2,500,008 | Richardson | Mar. 7, 1950 |
| 2,703,748 | Clarke et al. | Mar. 8, 1955 |
| 2,791,494 | Thompson | May 7, 1957 |

FOREIGN PATENTS

| | | |
|---|---|---|
| 276 | Great Britain | Nov. 9, 1901 |
| 457,547 | Great Britain | Aug. 26, 1935 |
| 477,646 | Great Britain | Jan. 4, 1938 |